2 Sheets--Sheet 1.

P. G. SMITH & E. WILLETS.
Combined Horse Hay-Rakes and Tedders.

No. 155,549. Patented Sept. 29, 1874.

WITNESSES
Henry N. Miller
C. L. Evert.

INVENTOR
Peter G. Smith
Edward Willets
per Chandler V Mason
Attorneys

P. G. SMITH & E. WILLETS.
Combined Horse Hay-Rakes and Tedders.
No. 155,549. Patented Sept. 29, 1874.

UNITED STATES PATENT OFFICE.

PETER G. SMITH AND EDWARD WILLETS, OF NORTH HEMPSTEAD, N. Y.

IMPROVEMENT IN COMBINED HORSE HAY-RAKES AND TEDDERS.

Specification forming part of Letters Patent No. 155,549, dated September 29, 1874; application filed September 12, 1874.

*To all whom it may concern:*

Be it known that we, PETER G. SMITH and EDWARD WILLETS, of North Hempstead, in the county of Queens and in the State of New York, have invented certain new and useful Improvements in Combined Horse Hay-Rake and Tedder; and do hereby declare that the following is a full, clear, and exact description thereof, reference being had to the accompanying drawings, and to the letters of reference marked thereon, making a part of this specification.

The nature of our invention consists in the construction and arrangement of a combined hay-rake and tedder, as will be hereinafter more fully set forth.

In order to enable others skilled in the art to which our invention appertains to make and use the same, we will now proceed to describe its construction and operation, referring to the annexed drawings, in which—

Figure 1:
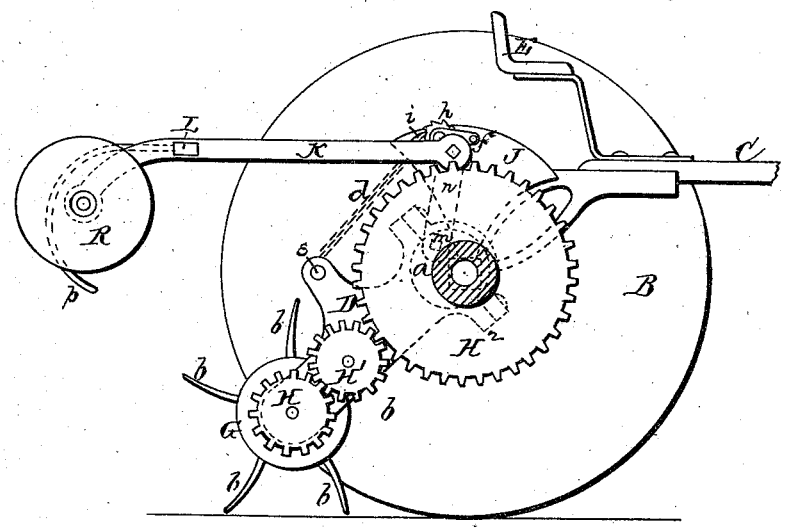
Figure 2:
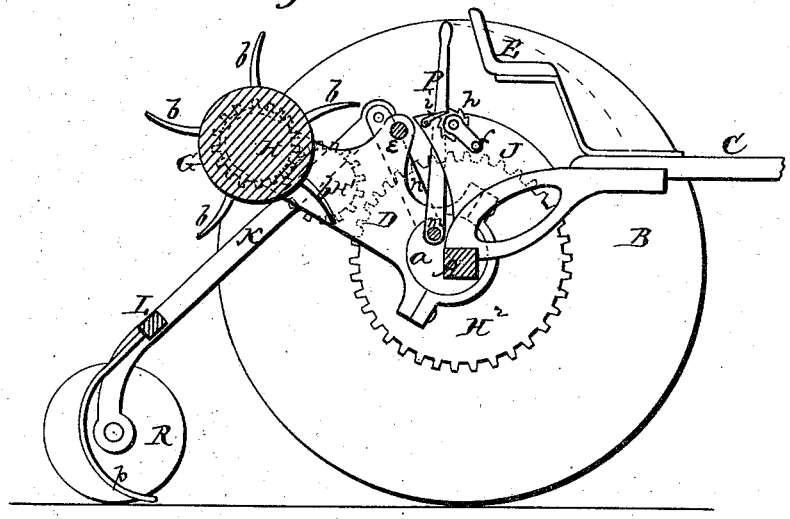
Figure 3:
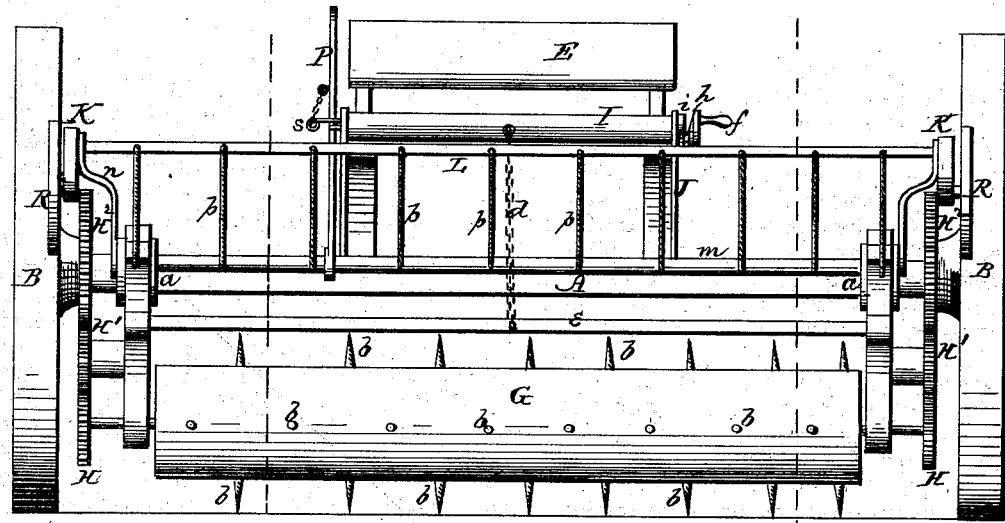
Figure 4:
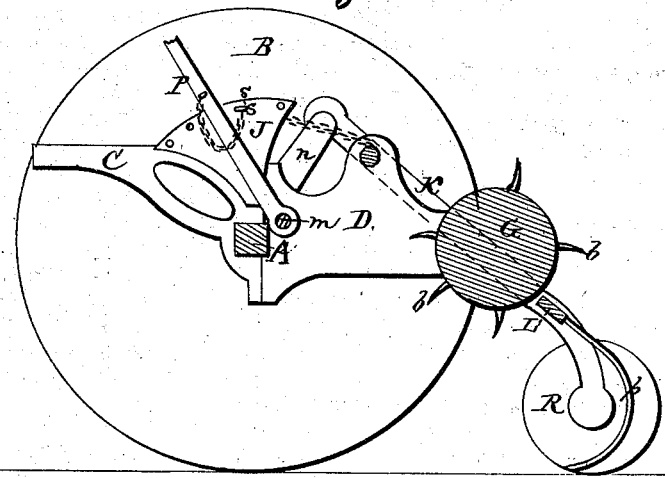

Figure 1 is a side elevation of our machine with one of the wheels removed, and showing the tedder in position for work and the rake elevated. Fig. 2 is a transverse vertical section of the same, showing the rake in position for use and the tedder elevated. Fig. 3 is a rear elevation of our machine, and Fig. 4 is another transverse vertical section of the same.

A represents the axle, upon each end of which is placed a driving-wheel, B. C C are the shafts, secured to the axle A by any suitable means, and supporting the driver's seat E. On the axle A, near each end, is secured an eccentric, $a$, on which is placed an arm, D, by means of a suitable box, so as to be easily removed when desired. In the outer ends of the arms D D a roller or cylinder, G, has its bearings, which roller or cylinder is provided with curved teeth $b\ b$, forming a hay-tedder. This roller G, with its tedder-teeth $b$, may be constructed in any suitable manner. On each journal of the roller G, outside of the arms D, is secured a cog-wheel, H, which gears with a similar wheel, $H^1$, mounted on a stud on the outside of the arm D. On the inner end of the hub of each driving-wheel B is attached or formed a cog-wheel, $H^2$, as shown. The eccentrics $a\ a$, around which the arms D turn, are so set on the axle, with relation to the cog-wheels $H^1$ and $H^2$, that when the arms D D are let down so that the tedder-teeth $b$ may operate, the said cog-wheels $H^1\ H^2$ will gear into each other, and thus revolve the hay-tedder; and when the arms D D are raised to a horizontal position the cog-wheel $H^1$ will be thrown out of gear with the cog-wheel $H^2$, and thus stop the revolutions of the tedder. The tedder is elevated by means of a chain, $d$, one end of which is fastened to a rod, $e$, connecting the arms D D, and the other end is fastened to a windlass, I, revolving in plates J J, attached to the axle or shafts, or both. Upon one of the journals of the windlass I is a crank, $f$, and ratchet-wheel $h$, and a pawl, $i$, pivoted on the plate J, to take into said wheel. By this means the tedder is elevated and held at any height desired. Through the eccentrics $a\ a$ on the axle A passes a shaft, $m$, upon the ends of which are secured arms $n\ n$. Upon studs at the outer ends of the arms $n\ n$ are fastened other arms K K, and in the outer ends of these arms is fastened the rake-head L, to which the rake-teeth $p\ p$ may be attached in any suitable manner. On the shaft $m$ is keyed or otherwise firmly secured a lever, P, by means of which the rake is elevated and lowered as required, and, when elevated, it is held by means of a pin, $s$, inserted in the plate J, and forming a stop for the lever P. On a stud projecting outward from the lower end of each arm K is mounted a wheel, R, which supports the rake on the ground when in use, and thus prevents the rake-teeth from catching in the ground.

Having thus fully described our invention, what we claim as new, and desire to secure by Letters Patent, is—

1. The combination, with the axle and its wheels, of a frame carrying a hay-tedding roller, and eccentrically pivoted upon the axle, and a hay-rake frame pivoted in projections in the axle, all arranged substantially as described, so that either the tedder or the rake may be used, as desired.

2. The combination, with the axle A and driving-wheels B B, of the eccentrics $a\ a$, arms D D, with tedding-roller G $b$, and the cog-wheels H $H^1\ H^2$, all substantially as and for the purposes herein set forth.

3. In a combined rake and tedder, the combination, with the eccentrically-pivoted arms D D and tedding-roller G $b$, of the connecting-bar e, chain d, and windlass I, with crank, ratchet-wheel, and pawl, all substantially as and for the purposes herein set forth.

4. In a combined rake and tedder, the combination of the shaft m, with lever P, arms n n, with studs, the arms K K, and the rake L p, for the purposes herein set forth.

In testimony that we claim the foregoing we have hereunto set our hands this 9th day of September, 1874.

PETER G. SMITH.

EDWARD WILLETS.

Witnesses:
  H. A. HALL,
  C. L. EVERT.